(No Model.)

E. E. RISIEN.
CHURN COVER ATTACHMENT.

No. 309,405. Patented Dec. 16, 1884.

WITNESSES:
C. Neveux
C. Sedgwick

INVENTOR:
E. E. Risien
BY Munn & Co
ATTORNEYS.

UNITED STATES PATENT OFFICE.

EDMUND EBENEZER RISIEN, OF SAN SABA, TEXAS.

CHURN-COVER ATTACHMENT.

SPECIFICATION forming part of Letters Patent No. 309,405, dated December 16, 1884.

Application filed February 12, 1884. (No model.)

*To all whom it may concern:*

Be it known that I, EDMUND E. RISIEN, of San Saba, in the county of San Saba and State of Texas, have invented a new and Improved Churn-Cover Attachment, of which the following is a full, clear, and exact description.

This invention is designed to be applied to churns in which the dashers, irrespective of any other movement that may be given them, have an up-and-down motion, as operated by hand through a staff or handle passing out through a hole in the churn lid or cover.

The object of the invention is twofold, viz: first, to do away with the annoyance of the milk or cream, while being churned, splashing or coming out through the lid onto the top of the churn; and, secondly, while thus guarding against the escape of the milk or cream, to provide a thorough ventilation by freely admitting air to the interior of the churn through the opening or openings in the lid.

To these ends the invention consists in a loose supplementary ventilating-lid, designed to be slipped onto or over the staff or handle of the churn above the lid proper, and constructed for operation substantially as hereinafter described, and pointed out in the claim.

Reference is to be had to the accompanying drawings, forming a part of this specification, in which similar letters of reference indicate corresponding parts in both figures.

Figure 1:
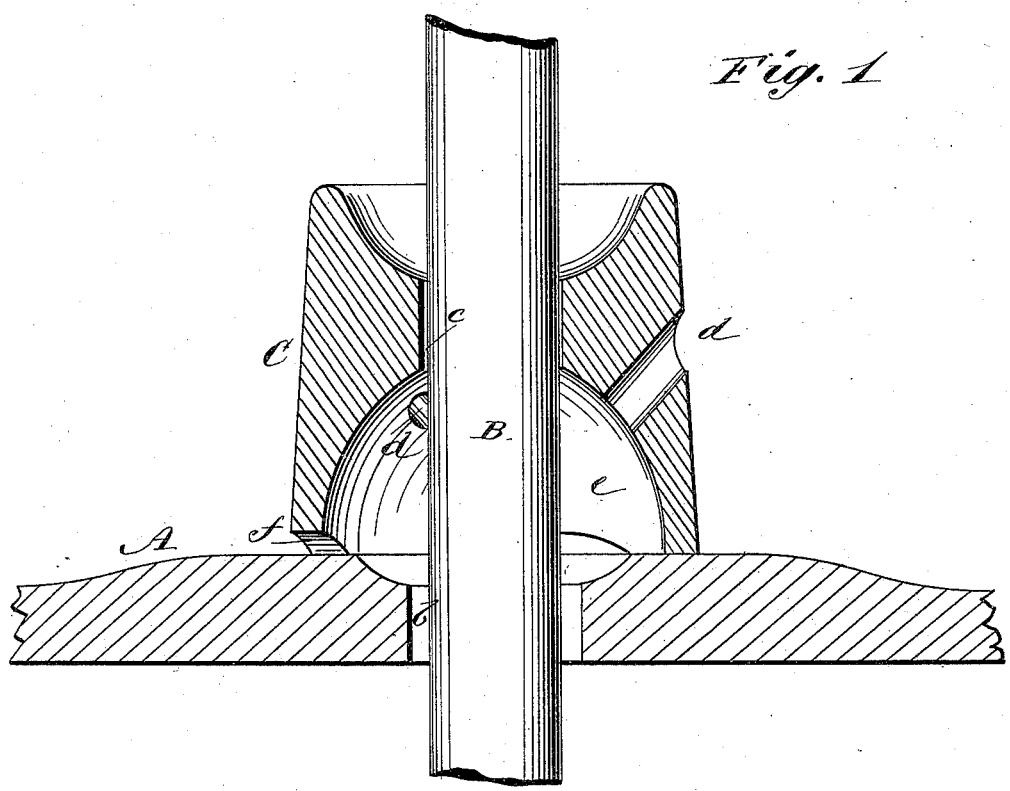
Figure 2:
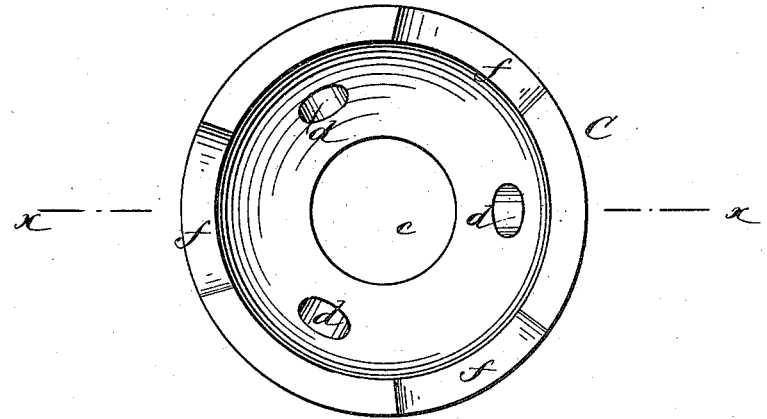

Figure 1 is mainly a vertical section on the line $x\,x$ in Fig. 2, showing my improved device or attachment applied over the staff or handle of the dasher to the main lid of the churn; and Fig. 2 is an inverted view of the device.

A indicates the lid proper of the churn in part, and B its dasher staff or handle, also in part, and arranged to pass up through an enlarged aperture, $b$, in said lid, to provide not only for its unrestricted movement up and down, but also laterally or in different directions.

C is the supplementary lid and ventilating device, which is constructed in the form of an inverted cup, designed to rest upon the lid proper of the churn around and outside of the aperture $b$ therein, and which has a hole, $c$, in it large enough to let the staff or handle B of the churn-dasher play freely through it without lifting said cup or cover, that is slipped to its place over the staff or handle. This inverted cup or loose attachment may be made of wood, and is constructed with any number of air-inlets, $d$, preferably sloping upward in an outward direction through its sides, and in communication with the interior or space $e$ of the cup, also having air-apertures or cut-away portions $f$ in the edge of the mouth of the inverted cup, which rests upon the main lid A. The aperture $b$ in the main lid, it should be observed, is larger than the aperture $c$ in the loose inverted cup or supplementary smaller cover C, so as to admit air freely to the interior of the churn, said air entering by the inlets $d$ and $f$ in the cup-cover, or any of them, and passing down through the aperture $b$ in the main lid. This, by the construction of the device as shown, my ventilating inverted cup C secures; and even an additional oblique hole may be made through the main lid under cover of the said cup without allowing of the milk being splashed or thrown out onto the top of the churn-cover outside of the cup by the working of the dasher. Furthermore, as said supplementary hollow lid or inverted cup C is a perfectly loose attachment, it requires no special fastening or fitting; but it rests unrestrained on the top of any ordinary churn-lid, and allows of any desired play being given to the churn-handle.

The device will be found particularly adapted to old well-worn churn-lids, and, being cheap, simple, efficient, and easily applied, it will be found a very useful appendage to churns of the description herein referred to.

I am aware that an inverted cup-shaped auxiliary cover or cream-trap for churns is not broadly new, and I therefore do not claim such.

Having thus described my invention, I claim as new and desire to secure by Letters Patent—

The supplementary loose churn-lid C, of an inverted-cup-shaped construction, with an aperture, c, for the close but free working of the dasher staff or handle therethrough, and provided with one or more oblique air-inlets, d, in its side, and apertures f in its bottom, in combination with a vertically-moving dasher staff or handle, B, and main lid A, having an enlarged aperture, b, for the staff or handle through it, essentially as shown and described.

EDMUND EBENEZER RISIEN.

Witnesses:
J. W. THOMAS,
R. B. WILKES.